United States Patent
Son et al.

(10) Patent No.: US 11,757,152 B2
(45) Date of Patent: Sep. 12, 2023

(54) METHOD FOR MANUFACTURING SECONDARY BATTERY AND METHOD FOR MANUFACTURING BATTERY PACK COMPRISING SAME

(71) Applicant: LG ENERGY SOLUTION, LTD., Seoul (KR)

(72) Inventors: Jong In Son, Daejeon (KR); Jee Eun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 151 days.

(21) Appl. No.: 17/609,998

(22) PCT Filed: Jan. 19, 2021

(86) PCT No.: PCT/KR2021/000754
§ 371 (c)(1),
(2) Date: Nov. 9, 2021

(87) PCT Pub. No.: WO2021/157909
PCT Pub. Date: Aug. 12, 2021

(65) Prior Publication Data
US 2022/0209342 A1    Jun. 30, 2022

(30) Foreign Application Priority Data
Feb. 6, 2020    (KR) ........................ 10-2020-0014553

(51) Int. Cl.
| | |
|---|---|
| *H01M 50/166* | (2021.01) |
| *H01M 50/578* | (2021.01) |
| *H01M 50/342* | (2021.01) |
| *H01M 10/04* | (2006.01) |
| *H01M 10/52* | (2006.01) |
| *H01M 50/317* | (2021.01) |
| *H01M 10/44* | (2006.01) |
| *H01M 50/184* | (2021.01) |

(Continued)

(52) U.S. Cl.
CPC ....... *H01M 50/166* (2021.01); *H01M 10/049* (2013.01); *H01M 10/52* (2013.01);
(Continued)

(58) Field of Classification Search
CPC ............. H01M 50/166; H01M 50/578; H01M 50/317; H01M 50/342; H01M 50/186;
(Continued)

(56) References Cited

U.S. PATENT DOCUMENTS

| | | | |
|---|---|---|---|
| 6,322,921 B1 | 11/2001 | Iwaizono et al. | |
| 2010/0216014 A1 | 8/2010 | Wendling et al. | |

(Continued)

FOREIGN PATENT DOCUMENTS

| | | |
|---|---|---|
| JP | 7-254402 A | 10/1995 |
| JP | 2003-142606 A | 5/2003 |

(Continued)

OTHER PUBLICATIONS

EPO machine generated English translation of KR 2015-0062739 A (Year: 2015).*

(Continued)

*Primary Examiner* — Christopher P Domone
*Assistant Examiner* — Kimberly Wyluda
(74) *Attorney, Agent, or Firm* — Birch, Stewart, Kolasch & Birch, LLP

(57) ABSTRACT

A method for manufacturing a secondary battery includes a cap assembly manufacturing step to provide a cap assembly having a top cap having a top hole, a safety vent having a vent hole, and a CID filter having a CID hole; an electrode assembly and electrolyte accommodating step of accommodating an electrode assembly into a can and injecting an electrolyte; a preliminary battery manufacturing step which comprises a disposing process of disposing the cap assembly above the can and a coupling process of coupling a positive electrode tab provided in the electrode assembly to a bottom surface of the CID filter of the cap assembly; an activation step of charging and discharging the preliminary battery; and a gas discharging step of pressing downward the positive (Continued)

electrode tab in contact with the CID filter, thereby opening the CID hole and discharging a gas generated inside the can.

15 Claims, 18 Drawing Sheets

(51) Int. Cl.
    *H01M 50/186*     (2021.01)
    *H01M 50/531*     (2021.01)
    *H01M 50/152*     (2021.01)

(52) U.S. Cl.
    CPC ....... *H01M 50/152* (2021.01); *H01M 50/317* (2021.01); *H01M 50/342* (2021.01); *H01M 50/578* (2021.01); *H01M 10/446* (2013.01); *H01M 50/184* (2021.01); *H01M 50/186* (2021.01); *H01M 50/531* (2021.01); *H01M 2200/20* (2013.01)

(58) Field of Classification Search
    CPC ............. H01M 50/531; H01M 50/184; H01M 10/049; H01M 10/52; H01M 10/446; H01M 2200/20
    See application file for complete search history.

(56) References Cited

U.S. PATENT DOCUMENTS

| | | |
|---|---|---|
| 2011/0244285 A1 | 10/2011 | Shinohara |
| 2014/0038005 A1 | 2/2014 | Yamato et al. |
| 2017/0084901 A1 | 3/2017 | Doo et al. |
| 2020/0266404 A1 | 8/2020 | Shibaoka |

FOREIGN PATENT DOCUMENTS

| | | |
|---|---|---|
| JP | 2005-285404 A | 10/2005 |
| JP | 2006-338981 A | 12/2006 |
| JP | 2011-216398 A | 10/2011 |
| JP | 2012-518890 A | 8/2012 |
| JP | 2012-174563 A | 9/2012 |
| JP | 2018-101575 A | 6/2018 |
| KR | 10-2006-0103027 A | 9/2006 |
| KR | 10-2006-0112728 A | 11/2006 |
| KR | 10-2008-0032911 A | 4/2008 |
| KR | 10-2008-0042966 A | 5/2008 |
| KR | 10-2009-0095334 A | 9/2009 |
| KR | 10-2010-0032731 A | 3/2010 |
| KR | 10-2015-0062739 A | 6/2015 |
| KR | 10-2017-0035489 A | 3/2017 |
| KR | 10-2017-0070542 A | 6/2017 |
| KR | 10-2017-0142986 A | 12/2017 |
| KR | 10-2018-0023696 A | 3/2018 |
| KR | 10-2018-0039829 A | 4/2018 |
| KR | 10-2019-0084740 A | 7/2019 |
| WO | WO 98/01913 A1 | 1/1998 |
| WO | WO 2012/147782 A1 | 11/2012 |

OTHER PUBLICATIONS

Extended European Search Report for European Application No. 21751234.2, dated Feb. 2, 2023.

International Search Report for PCT/KR2021/000754 dated Apr. 29, 2021.

* cited by examiner

METHOD FOR MANUFACTURING SECONDARY BATTERY AND METHOD FOR MANUFACTURING BATTERY PACK COMPRISING SAME

CROSS-REFERENCE TO RELATED APPLICATION

The present application claims the benefit of the priority of Korean Patent Application No. 10-2020-0014553, filed on Feb. 6, 2020, which is hereby incorporated by reference in its entirety.

TECHNICAL FIELD

The present invention relates to a method for manufacturing a secondary battery and a method for manufacturing a battery pack comprising same, and particularly, to a method for manufacturing a secondary battery, in which a gas is easily discharged, and a method for manufacturing a battery pack comprising the same.

BACKGROUND ART

In general, secondary batteries refer to chargeable and dischargeable batteries, unlike primary batteries that are not chargeable. Such a secondary battery is being widely used in the high-tech electronic fields such as phones, notebook computers, and camcorders.

The secondary batteries are classified into can-type secondary batteries and pouch-type secondary batteries, and the can-type secondary batteries comprise an electrode assembly, an electrolyte, a can for accommodating the electrode assembly and the electrolyte, and a cap assembly mounted to an opening portion of the can.

However, the cap-type secondary batteries have a structure in which the inside of the can is sealed, and a gas generated inside the can in an activation process may not be discharged to the outside. Accordingly, there is a limitation in improving the battery performance.

DISCLOSURE OF THE INVENTION

Technical Problem

The present invention has been made to solve the above problem, and an object of the present invention is to provide a method for manufacturing a secondary battery and a method for manufacturing a battery pack comprising the same, in which a gas generated inside a can may be discharged to the outside after an activation process, thereby making it possible to significantly improve battery performance.

Technical Solution

To achieve the object described above, a method for manufacturing a secondary battery of the present invention may comprise: a cap assembly manufacturing step of disposing the top cap having a top hole on the top side, disposing a safety vent having a vent hole below the top cap, and then disposing a current interrupt device (CID) filter having a CID hole below the safety vent, thereby manufacturing a cap assembly; an electrode assembly and electrolyte accommodating step of accommodating an electrode assembly into a can and then injecting an electrolyte to impregnate the electrode assembly therewith; a preliminary battery manufacturing step which comprises a disposing process of disposing the cap assembly above the can and a coupling process of coupling a positive electrode tab provided in the electrode assembly to a bottom surface of the CID filter of the cap assembly, thereby manufacturing a preliminary battery, wherein a distal end of the positive electrode tab closes the CID hole; an activation step of charging and discharging the preliminary battery; and a gas discharging step of pressing downward the positive electrode tab in contact with the CID filter through the CID hole, the vent hole, and the top hole of the cap assembly with a force, thereby opening the CID hole and discharging a gas generated inside the can to the outside through the CID hole, the vent hole, and the top hole.

The top hole, the vent hole, and the CID hole may be located on the same vertical line in the cap assembly manufacturing step.

The vent hole may have a diameter greater than diameters of the top hole and the CID hole in the cap assembly manufacturing step.

The cap assembly manufacturing step may further comprise a process of coupling the safety vent to a top surface of the CID filter through the top hole so that the vent hole and the CID hole are in communication with each other.

A lower surface of the safety vent around the vent hole and an upper surface of the CID filter around the CID hole, which correspond to each other, may be sealed and coupled.

The positive electrode tab may comprise a lower tab portion connected to the electrode assembly and an upper tab portion connected to the lower tab portion, the upper tab portion having a first end connected to the lower tab portion and a second end spaced from the first end, wherein, in the coupling process, the upper tab portion is brought into surface contact with the bottom surface of the CID filter, the second end of the upper tab portion is moved to close the CID hole, and then the first end of the upper tab portion is coupled to the bottom surface of the CID filter.

A sealing protrusion may be provided on the upper tab portion, wherein, and, when the second end of the upper tab portion is moved to close the CID hole in the coupling process, the sealing protrusion is inserted into the CID hole to increase a sealing force.

When the force of pressing the positive electrode tab is removed in the gas discharging step, the positive electrode tab may close the CID hole again while returning to an original position.

The method may further comprise a welding of welding a lower end of an inner circumferential surface of the CID hole to the positive electrode tab through the vent hole and the top hole of the cap assembly after the gas discharging step.

The welding may be performed in the welding step along the inner circumferential surface of the CID hole in contact with the positive electrode tab, thereby forming a seal between the CID filter and the positive electrode tab.

The method may further comprise a sealing ball inserting step of inserting a sealing ball into the CID hole through the top hole and the vent hole after the welding step.

The method may further comprise a bonding step of partially melting the sealing ball through the top hole and the vent hole after the sealing ball inserting step, thereby sealing and bonding the sealing ball and the CID hole.

The method may further comprise a closing step, of coupling a closing cover to the top hole after the bonding step, thereby closing the top hole.

The closing cover may be made of a same material as the top cap.

Also, a method for manufacturing a battery pack of the present invention may comprise: a step of manufacturing a secondary battery; and a step of accommodating the secondary battery in a battery case.

Advantageous Effects

The method for manufacturing the secondary battery of the present invention comprises the step of manufacturing the cap assembly which is provided with the top cap, the safety vent, and the CID filter. The top cap has the top hole, the safety vent has the vent hole, and the CID filter has the CID hole. The CID hole is closed as the positive electrode tab coupled to the CID filter is brought into close surface contact therewith. Thus, the positive electrode tab that closes the CID hole of the CID filter may be pressed through the top hole, the vent hole, and the CID hole. Accordingly, as the CID hole is opened, the gas generated inside the can may be discharged to the outside through the CID hole, the vent hole, and the top hole. As a result, as the gas generated inside the can is discharged, the battery performance may be significantly improved.

Also, in the method for manufacturing the secondary battery of the present invention, the top hole, the vent hole, and the CID hole are formed on the same vertical line. Thus, the positive electrode tab that has closed the CID hole is viewed from the outside through the top hole, the vent hole, and the CID hole. Accordingly, the positive electrode tab may be easily pressed to open the CID hole.

Here, only some of the top hole, the vent hole, and the CID hole may be formed overlapping the same vertical line. That is, when viewed from above the cap assembly, only some of the top hole, the vent hole, and the CID hole may be formed to overlap each other. Accordingly, it is possible to prevent the unnecessary foreign objects from being inserted.

Also, in the method for manufacturing the secondary battery of the present invention, the vent hole has the diameter greater than those of the top hole and the CID hole. Thus, the tool that has gone through the top hole may more effectively pass through the vent hole, and particularly, it is possible to prevent the vent hole from being damaged by the tool.

Also, in the method for manufacturing the secondary battery of the present invention, the vent hole and the CID hole are connected as the safety vent and the CID filter are coupled to each other. Thus, the tool that has gone through the top hole may be effectively inserted into the vent hole and the CID hole.

Also, in the method for manufacturing the secondary battery of the present invention, the positive electrode tab is made of the material having the elastic restoring force. Thus, the positive electrode tab may be elastically brought into close surface contact with the bottom surface of the CID filter. Accordingly, The CID hole may be stably closed. As a result, it is possible to prevent the CID hole from being unintentionally opened.

Also, in the method for manufacturing the secondary battery of the present invention, the positive electrode tab has the hemispherical sealing protrusion which is inserted into the CID hole to seal the CID hole. Thus, the CID hole may be more stably closed.

Also, the method for manufacturing the secondary battery of the present invention further comprises the step of inserting the sealing ball into the CID hole mutually connected. Thus, when all the gas generated inside the can is discharged, the vent hole and the CID hole are sealed so that the electrolyte inside the can is not discharged to the outside. As a result, the safety may be increased.

Also, the method for manufacturing the secondary battery of the present invention comprises the step of coupling the closing cover to the top hole of the top cap. Thus, the coupling force of the external terminal and the top cap may be increased.

MODE FOR CARRYING OUT THE INVENTION

Figure 1:
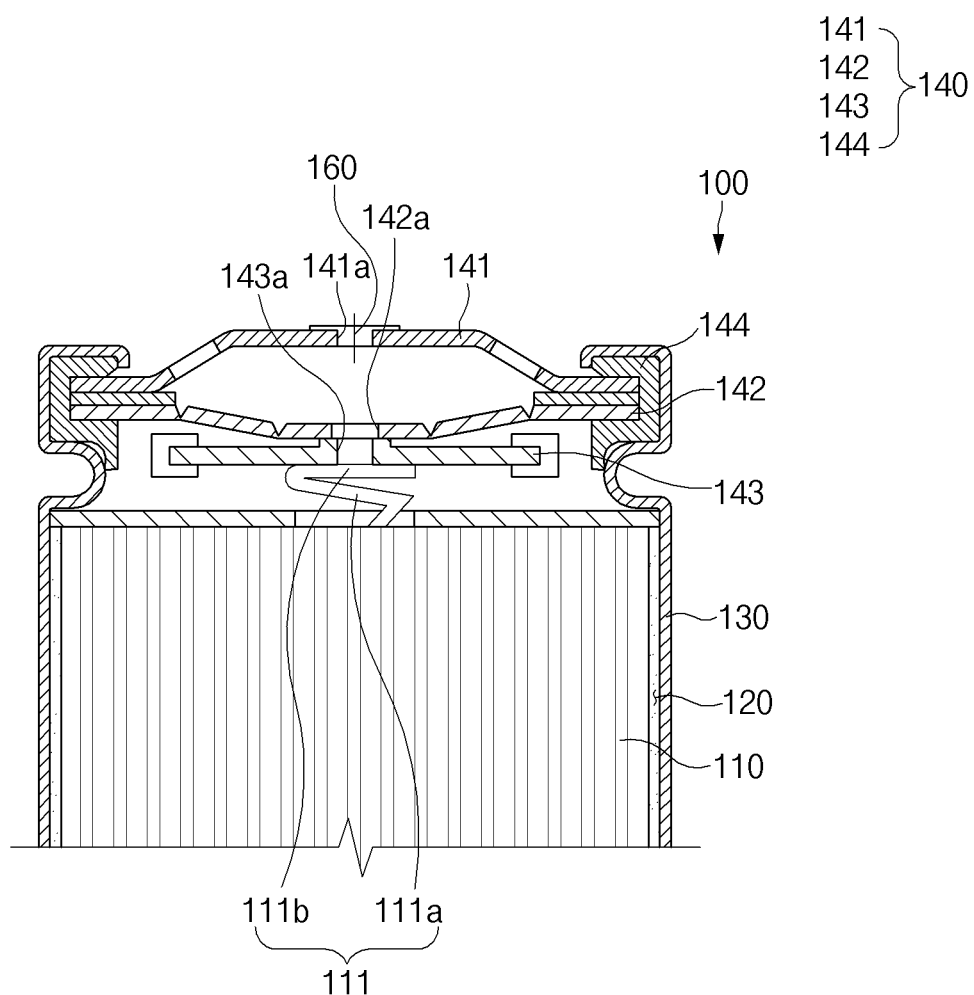
FIG. 1 is a cross-sectional view illustrating a secondary battery according to a first embodiment of the present invention.
Figure 2:
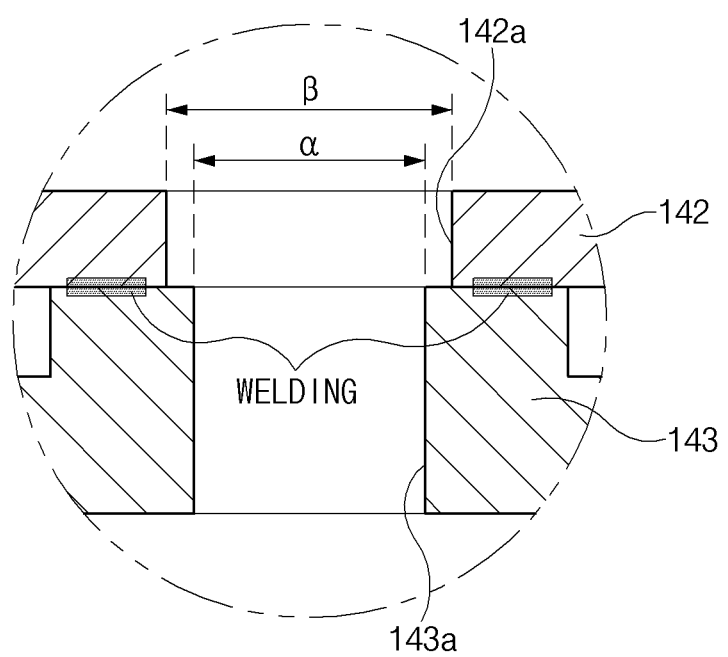
FIG. 2 is an enlarged view of a portion of FIG. 1.

Hereinafter, embodiments of the present invention will be described in detail with reference to the accompanying drawings so as to be easily carried out by a person skilled in the art to which the present invention pertains. However, the present invention may be implemented in various different forms, and is not limited to the embodiments described herein. Also, in the drawings, a part irrelevant to the description will be omitted to clearly describe the present invention, and similar elements will be designated by similar reference numerals throughout the specification.

Secondary Battery According to a First Embodiment of the Present Invention

As illustrated in FIGS. 1 to 6, a secondary battery 100 according to the first embodiment of the present invention comprises an electrode assembly 110, an electrolyte 120, a can 130 for accommodating the electrode assembly 110 and the electrolyte 120, and a cap assembly 140 mounted to an opening portion of the can 130.

The electrode assembly 110 has a structure provided with a positive electrode tab. That is, the electrode assembly 110 may have a structure in which a plurality of electrodes and a plurality of separators are stacked alternately and wound in a roll shape. Also, the plurality of electrodes comprise a positive electrode and a negative electrode. Also, the positive electrode is provided with a positive electrode tab 111 coupled to the cap assembly 140, and the negative electrode may be provided with a negative electrode tab coupled to the bottom surface of the can 130.

The electrolyte 120 is to improve performance of the electrode assembly and is injected into the can 130, and the electrode assembly 110 is impregnated therewith.

The can 130 has a cylindrical shape with an open upper portion, and comprises an accommodating part at a lower portion thereof which accommodates the electrode assembly 110 and the electrolyte 120 and a sealing part at an upper portion thereof to which the cap assembly 140 is mounted.

The cap assembly 140 is mounted to the opening portion of the can, and particularly, has a structure capable of discharging to the outside a gas generated inside the can 130 in a secondary battery activating process.

That is, the cap assembly 140 comprises a top cap 141 which has a top hole 141a vertically passing therethrough, a safety vent 142 which is provided below the top cap 141 and has a vent hole 142a vertically passing therethrough, and a current interrupt device (CID) filter 143 which is provided below the safety vent 142, coupled to the positive electrode tab 111 provided in the electrode assembly 110, has a CID hole 143a vertically passing therethrough. The CID hole 143a is closed or opened by the positive electrode tab 111.

Here, the CID hole 143a is closed when the positive electrode tab 111 is brought into close surface contact with the CID filter 143 comprising the CID hole 143a, and is opened when the positive electrode tab 111 is spaced apart from the CID filter 143 comprising the CID hole 143a.

Figure 3:
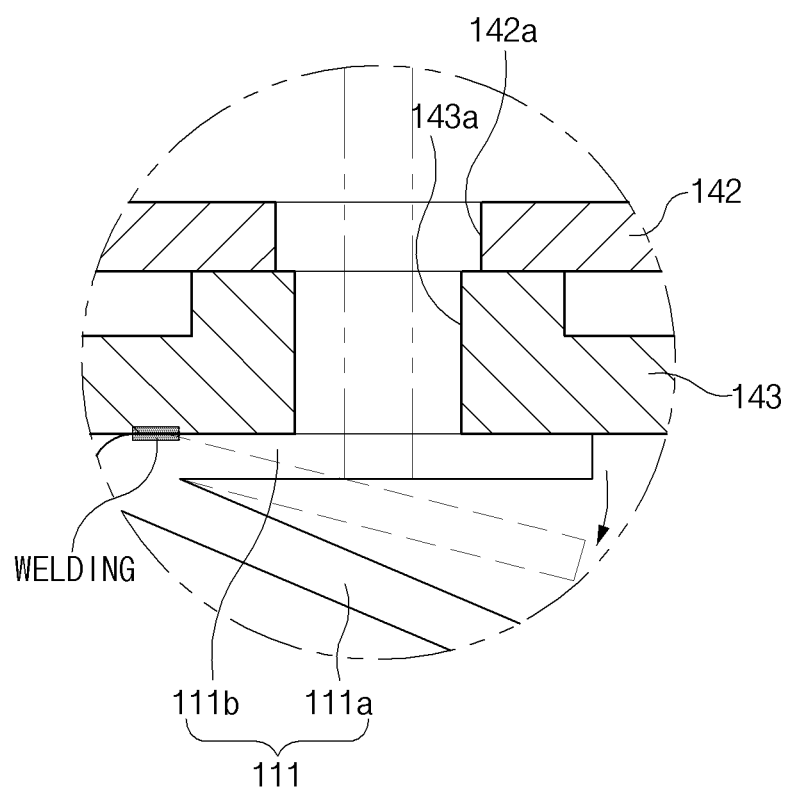
FIG. 3 is a view showing a state in which a positive electrode tab is pressed in the secondary battery according to a first embodiment of the present invention.
Figure 4:
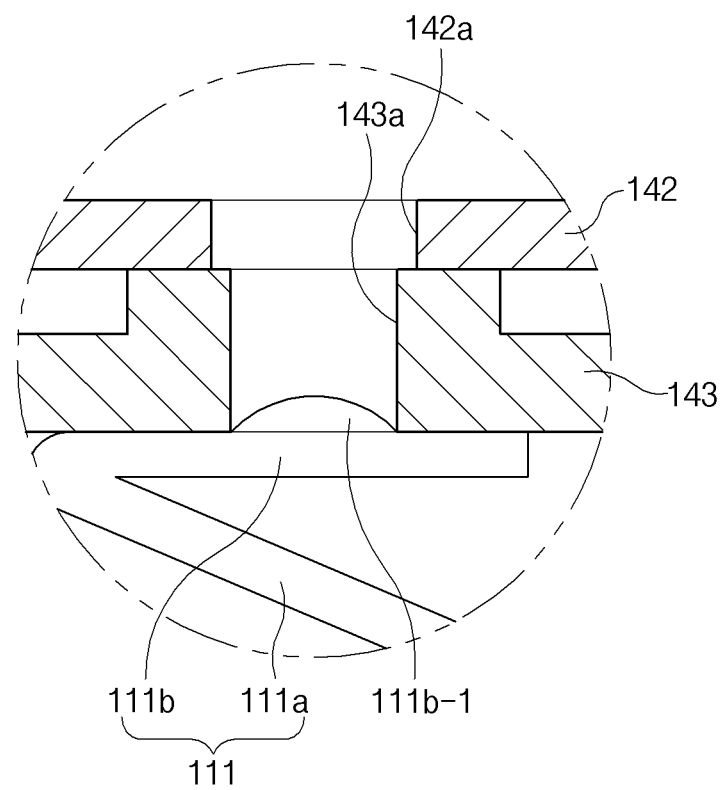
FIG. 4 is a view illustrating a sealing protrusion formed in the positive electrode tab of the secondary battery according to the first embodiment of the present invention.
Figure 5:
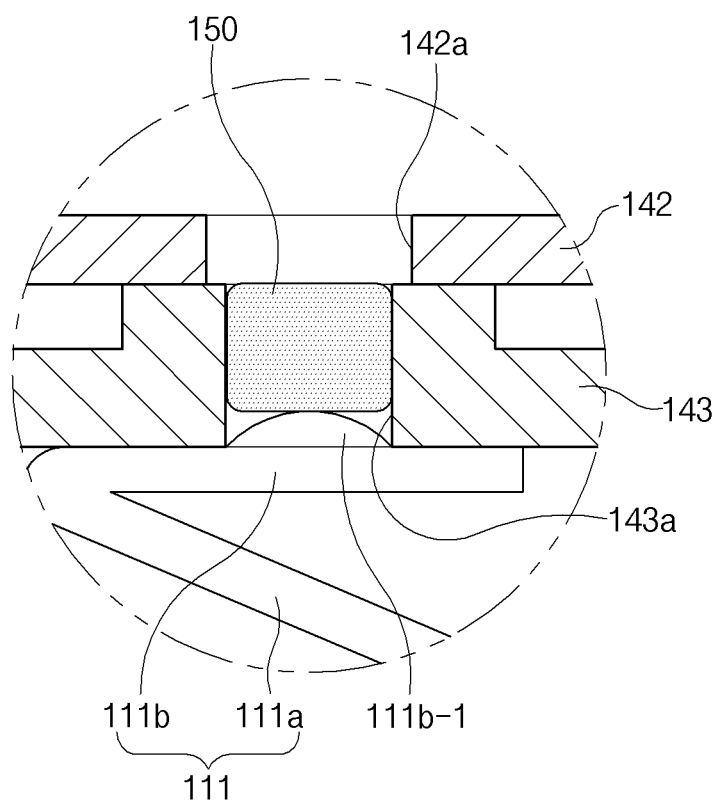
FIG. 5 is a cross-sectional view illustrating a sealing ball of the secondary battery according to the first embodiment of the present invention.
Figure 6:
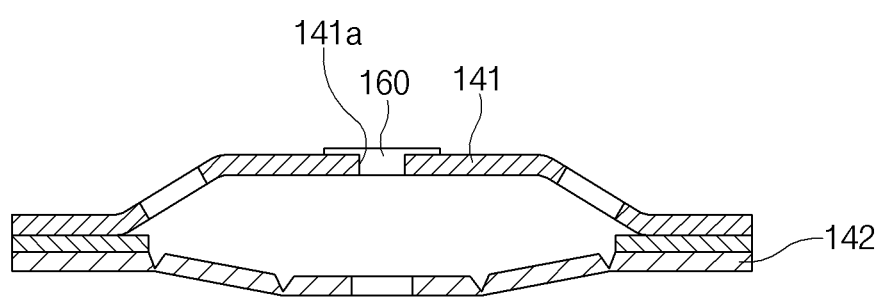
FIG. 6 is a cross-sectional view illustrating a closing cover of the secondary battery according to the first embodiment of the present invention.
Figure 7:
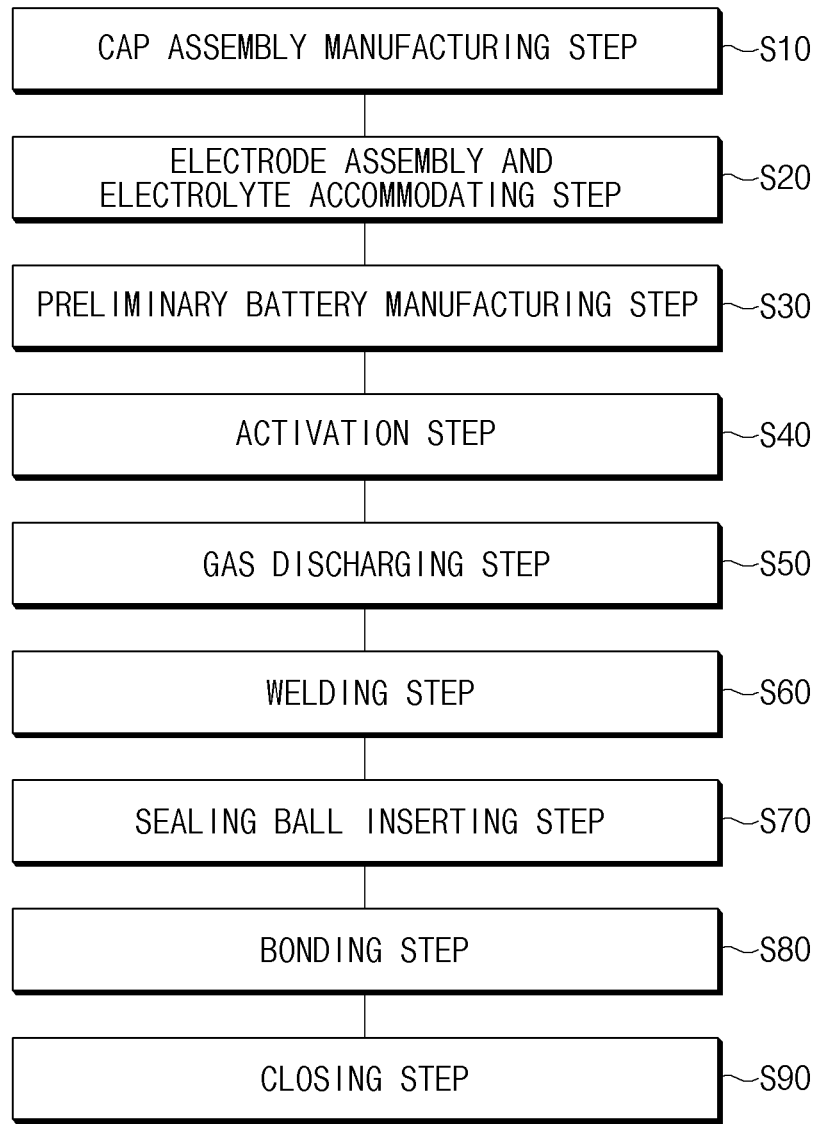
FIG. 7 is a flowchart showing a method for manufacturing the secondary battery according to the first embodiment of the present invention.

Referring to FIG. 3, in the cap assembly 140 having the structure described above, a long stick-shaped tool 1 passes through the top hole 141a of the top cap 141, the vent hole 142a of the safety vent 142, and the CID hole 143a of CID filter 143, and then may press the positive electrode tab 111 that has closed the CID hole 143a. Accordingly, as the CID hole 143a is opened, the gas generated inside the can 130 may be discharged to the outside through the CID hole 143a, the vent hole 142a, and the top hole 141a. As a result, the secondary battery performance may be significantly improved.

That is, in the secondary battery 100 according to the first embodiment of the present invention, the CID hole 143a is closed by the positive electrode tab 111 in an activation process, and thus the charging and discharging may be stably performed. After the activation process, the gas generated inside the can during the activation process may be discharged to the outside through the cap assembly 140. After the gas is discharged, the positive electrode tab 111 and the CID hole 143a are sealed and welded to prevent leakage of the electrolyte.

Thus, the secondary battery 100 according to the first embodiment of the present invention comprises the cap assembly 140 having a gas discharging structure. Thus, the cap-type secondary battery may also discharge the gas generated inside the can to the outside after the activation process, and as a result, the battery performance may be significantly improved.

Here, the top hole 141a, the vent hole 142a, and the CID hole 143a have minimum diameters enabling the tool 1 to be inserted therein. For example, the top hole 141a, the vent hole 142a, and the CID hole 143a may have a diameter of 1-3 mm. Accordingly, the gas inside the can is discharged to the outside, and it is possible to significantly prevent inflow of foreign objects to the top hole 141a, the vent hole 142a, and the CID hole 143a.

Also herein, the top hole 141a, the vent hole 142a, the CID hole 143a may be formed on the same vertical line. That is, referring to FIG. 1, the top hole 141a of the top cap 141, the vent hole 142a of the safety vent 142, and the CID hole 143a of the CID filter 143 are vertically disposed and located on the same vertical line. Accordingly, the positive electrode tab 111 that closes the CID hole 143a may be viewed from the outside through the top hole 141a, the vent hole 142a, and the CID hole 143a, and as a result, whether the CID hole 143a is closed may be easily checked from the outside of the secondary battery. In particular, as the top hole 141a, the vent hole 142a, and the CID hole 143a are located on a straight line, the positive electrode tab 111 may be more effectively pressed to open the CID hole 143a. Here, the top hole 141a is formed at the central point of the top cap, the vent hole 142a at the central point of the safety vent, and the CID hole 143a at the central point of the CID filter 143. Accordingly, a reduction in strength may be minimized.

Here, only some of the top hole 141a, the vent hole 142a, and the CID hole 143a may be located on the same vertical line. For example, only halves of the top hole 141a, the vent hole 142a, and the CID hole 143a may be located on the same vertical line, and the other halves may be located on another vertical line. Accordingly, it is possible to significantly prevent an unnecessary object from flowing in through the top hole 141a, the vent hole 142a, and the CID hole 143a, and particularly, it is possible to prevent the positive electrode tab from being pressed by the unnecessary object.

Here, a diameter $\beta$ of the vent hole 142a may be greater than a diameter $\alpha$ of each of the top hole 141a and the CID hole 143a. That is, when the tool for pressing the positive electrode tab 111 is inserted into the vent hole 142a located in the middle between the top hole 141a and the CID hole 143a, it may be difficult to easily insert the tool due to a flow phenomenon thereof. Accordingly, the vent hole 142a has a diameter greater than those of the top hole 141a and the CID hole 143a, and thus the tool going through the top hole 141a may easily pass therethrough. In particular, it is possible to prevent the vent hole 142a from being damaged by the tool for the pressing the positive electrode tab 111. That is, the safety vent 142 is to be cut to prevent explosion of the secondary battery, and a failure may occur due to the damage to the vent hole 142a. In order to prevent the above, the vent hole 142a may have a diameter greater than those of the top hole 141a and the CID hole 143a, and accordingly, the damage to the vent hole 142a is prevented. For example, the diameter α of each of the top hole 141a and the CID hole 143a is formed to be 2 mm, and the CID hole 143a is formed to be 3 mm.

Also, the vent hole 142a and the CID hole 143a are connected to each other as the safety vent 142 and the CID filter 143 are coupled, and accordingly, the vent hole 142a and the CID hole 143a may be located on the same vertical line. In particular, the outer circumferential surface of the vent hole 142a and the outer circumferential surface of the CID hole 143a are sealed and coupled, and accordingly, it is possible to prevent the foreign objects or the electrolyte from leaking into the vent hole 142a and the CID hole 143a through between the safety vent 142 and the CID filter 143.

Also, the positive electrode tab 111 comprises a lower tab portion 111a and an upper tab portion 111b. The lower tab portion 111a is connected to the positive electrode of the electrode assembly 110. One end of the upper tab portion 111b connected to the lower tab portion 111a is coupled to the CID filter 143, and the other end closes the CID hole while coming into close surface contact with the bottom surface of the CID filter 143 in which the CID hole 143a is located. That is, after the upper tab portion 111b is brought into close surface contact with the CID filter 143, the one end is coupled to the CID filter 143 by welding, and the other end closes the CID hole while coming into close surface contact with the CID filter 143 comprising the CID hole 143a. Here, when the other end of the upper tab portion 111b that closes the CID hole 143a is pressed, the CID hole 143a is opened as the other end of the upper tab portion 111b is spaced apart from the CID hole 143a. When a force of pressing the other end of the upper tab portion is removed, the other end of the upper tab portion 111b closes the CID hole while coming into close surface contact with the CID filter 143 comprising the CID hole 143a again due to a restoring force of the upper tab portion.

Accordingly, the positive electrode tab 111 may stably close the CID hole until the activation process of the secondary battery, and may be spaced apart from the CID filter 143 after the activation process to open the CID hole. Thus, the gas inside the can may be simply discharged to the outside.

Here, after the discharging of gas, the inner circumferential surface of the CID hole 143a and the positive electrode tab 111 may be sealed and coupled. That is, the other end of the upper tab portion 111b in close surface contact with the bottom surface of the CID filter 143 is sealed and coupled to the CID filter 143 after the discharging of gas, and accordingly the CID hole is prevented from opening again. As a result, it is possible to prevent leakage of the electrolyte.

Here, the positive electrode tab 111 may be made of a material having an elastic restoring force. Accordingly, the other end of the upper tab portion 111b is elastically brought into close surface contact with the bottom surface of the CID filter 143, and as a result, the CID hole 143a may be stably closed. In particular, when the external force of pressing the other end of the upper tab portion 111b is removed, the other end of the upper tab portion 111b rapidly returns to the original position due to the restoring force. As a result, the CID hole 143a may be rapidly and stably closed. Here, the positive electrode tab 111 may be alloy steel that contains a material having an elastic restoring force.

Also, the positive electrode tab 111 may comprise a sealing protrusion 111b-1 which is to be inserted into the CID hole 143a. That is, the sealing protrusion 111b-1 is to increase a sealing force between the positive electrode tab 111 and the CID hole 143a, has the same diameter as the CID hole 143a, and increases the sealing force between the positive electrode tab 111 and the CID hole 143a while being inserted into the CID hole 143a. In particular, the sealing protrusion 111b-1 is formed as a hemispherical protrusion portion, and accordingly, the sealing protrusion 111b-1 may be easily coupled to the CID hole 143a or easily separated therefrom.

Here, when the discharging of gas generated inside the can is finished, a sealing ball 150 is inserted into the CID hole 143a. The sealing ball 150 is to seal the CID hole 143a, has a spherical shape, and here seals the CID hole 143a while being inserted into the CID hole 143a through the top hole 141a and the vent hole 142a. In particular, the sealing ball 150 is melted through a thermal fusing device (not shown), and accordingly the sealing force between the CID hole 143a and the sealing ball 150 may increase as the sealing ball 150 is bonded to the inner circumferential surface of the CID hole 143a.

Also, the cap assembly 140 may further comprise a closing cover 160 which is to be coupled to the top hole 141a. That is, the closing cover 160 is to increase connectivity of a connection terminal connected to the top cap 141, and is made of the same material as the top cap 141. Accordingly, it is possible to prevent foreign objects from flowing in through the top hole 141a and increase the connectivity of the connection terminal.

Hereinafter, a method for manufacturing a secondary battery of the present invention will be described.

Method for Manufacturing the Secondary Battery According to the First Embodiment of the Present Invention A method for manufacturing the secondary battery according to the first embodiment of the present invention comprises a cap assembly manufacturing step (S10), an electrode assembly and electrolyte accommodating step (S20), a preliminary battery manufacturing step (S30), an activation step (S40), a gas discharging step (S50), a welding step (S60), a sealing ball inserting step (S70), a bonding step (S80), and a closing step (S90), as illustrated in FIGS. 7 to 16.

Figure 8:
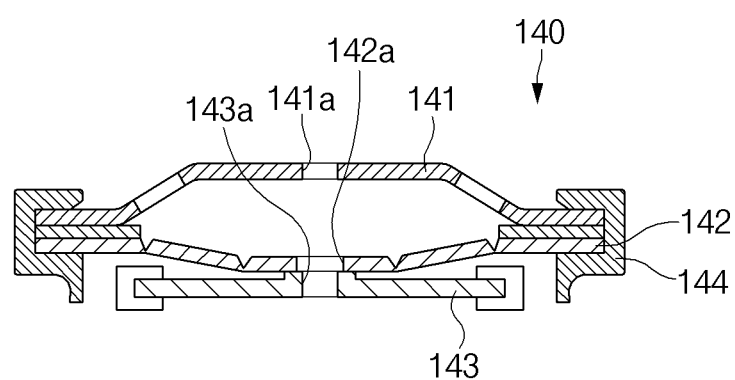
FIG. 8 is a cross-sectional view illustrating a cap assembly manufacturing step in the method for manufacturing the secondary battery according to the first embodiment of the present invention.

Referring to FIG. 8, the cap assembly manufacturing step (S10) comprises a cap assembly perforating process and a cap assembly assembling process. In the cap assembly perforating process, a top cap 141 is perforated, by using a perforating device (not shown), to form a top hole 141a that vertically passes through the center of the top surface thereof, a safety vent 142 is perforated to form a vent hole 142a that vertically passes through the center of the top surface thereof, and a CID filter 143 is perforated to form a CID hole 143a that vertically passes through the center of the top surface thereof.

Here, the perforation is preformed such that the top hole 141a, the vent hole 142a, and the CID hole 143a are located on the same vertical line when a cap assembly is manufactured. This is so that a tool is stably inserted to go through the top hole 141a, the vent hole 142a, and the CID hole 143a.

Here, the perforation is performed such that the vent hole 142a has a diameter greater than those of the top hole 141a and the CID hole 143a, and accordingly, it is possible to prevent the vent hole 142a from being damaged by the tool that is going through the top hole 141a. For example, the vent hole 142a has a diameter greater than those of the top hole 141a and the CID hole 143a by 1 mm-2 mm.

In the cap assembly assembling process, the top cap 141 having the top hole 141a is disposed on the top side, the safety vent 142 having the vent hole 142a is disposed below the top cap 141, and then the CID filter 143 having the CID hole 143a is disposed below the safety vent 142. Here, the top hole 141a of the top cap 141, the vent hole 142a of the safety vent 142, and the CID hole 143a of the CID filter 143 are located on the same vertical line. Also, a gasket 144 is coupled so as to surround the outer circumferential surfaces of the top cap and the safety vent.

Here, the cap assembly manufacturing step (S10) further comprises a safety vent and CID filter coupling process. In the safety vent and CID filter coupling process, a bonding device is inserted through the top hole 141a, and then the vent hole 142a and the CID hole 143a are connected by bringing the safety vent 142 into close contact with the top surface of the CID filter 143. Heat is applied in a state described above to couple the safety vent 142 and the CID filter 143.

Here, the safety vent 142 and the CID filter 143 are coupled so as to completely form a seal between the vent hole 142a and the CID hole 143a. That is, the outer circumferential surface of the vent hole and the outer circumferential surface of the CID hole, which correspond to each other, are sealed and coupled.

When the cap assembly manufacturing step (S10) is finished, the cap assembly having the top hole, the vent hole, and the CID hole may be manufactured.

Thus, when the processes described above are finished, a cap assembly 140 is completed.

Figure 9:
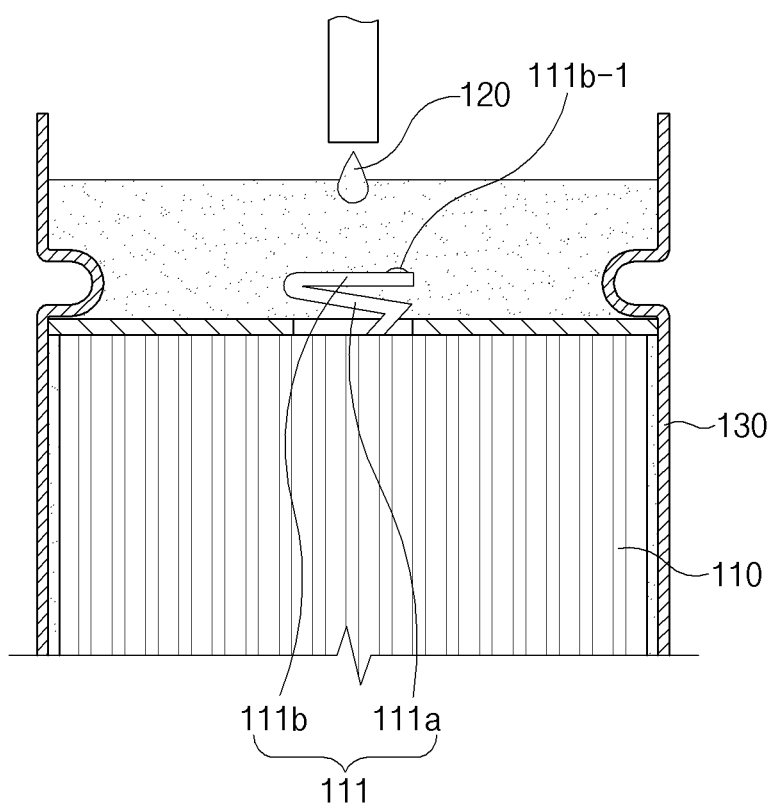
FIG. 9 is a cross-sectional view illustrating an electrode assembly and electrolyte accommodating step in the method for manufacturing the secondary battery according to the first embodiment of the present invention.

Referring to FIG. 9, in the electrode assembly and electrolyte accommodating step (S20), an electrode assembly 110 is accommodated through an opening portion of a can 130, and then an electrolyte 120 is injected into the can 130. Thus, the electrode assembly 110 is impregnated with the electrolyte.

Here, the electrode assembly 110 has a structure in which a plurality of electrodes and a plurality of separators are stacked alternately and wound in a roll shape, and the plurality of the electrodes comprise a positive electrode and a negative electrode. Also, the positive electrode is provided with a positive electrode tab 111 coupled to the cap assembly 140, and the negative electrode may be provided with a negative electrode tab coupled to the bottom surface of the can 130.

Figure 10:
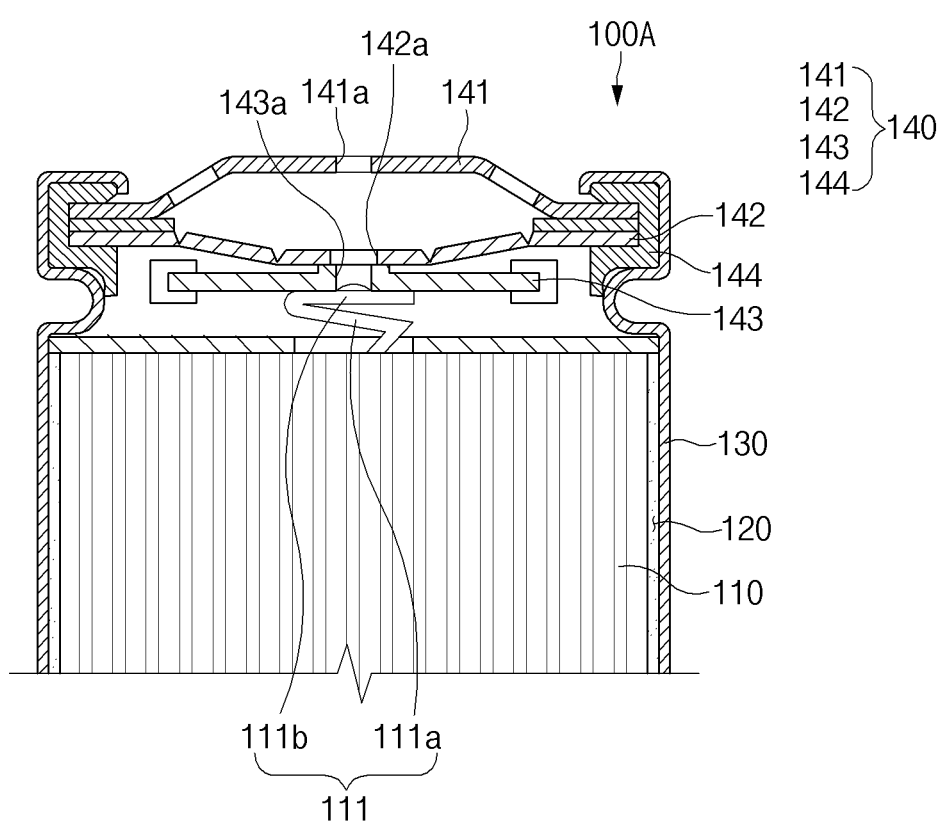
FIG. 10 is a cross-sectional view illustrating a preliminary battery manufacturing step in the method for manufacturing the secondary battery according to the first embodiment of the present invention.

Referring to FIG. 10, the preliminary battery manufacturing step (S30) is to manufacture a preliminary battery which has not been charged and discharged, and comprises a disposing process and a coupling process.

In the disposing process, the cap assembly 140 is disposed above the can 130. Here, the cap assembly 140 is disposed such that the CID filter 143 of the cap assembly 140 becomes adjacent to the positive electrode tab 111 of the electrode assembly 110.

In the coupling process, the positive electrode tab 111 provided in the electrode assembly 110 is coupled to the CID filter 143 of the cap assembly 140 while closing the CID hole 143a. Here, the positive electrode tab 111 comprises a lower tab portion 111a connected to the electrode assembly 110 and an upper tab portion 111b connected to the lower tab portion 111a.

That is, in the coupling process, the upper tab portion 111b is brought into close surface contact with the bottom surface of the CID filter 143a, and then the other end of the upper tab portion 111b is moved to close the CID hole 143a. Subsequently, one end of the upper tab portion 111b is welded and coupled to the bottom surface of the CID filter 143. In other words, the other end of the upper tab portion 111b closes the CID hole 143a while coming into close surface contact with the bottom surface of the CID filter 143 comprising the CID hole 143a, and one end is welded to the CID filter 143a to couple the CID filter and the positive electrode tab. In particular, the positive electrode tab 111 has an elastic force toward the CID hole 143a, and accordingly, the CID hole 143a may be stably closed.

Here, the other end of the upper tab portion 111b of the positive electrode tab 111 comprises a sealing protrusion 111b-1 formed of a hemispherical protrusion portion. That is, in the coupling process, the sealing protrusion 111b-1 may be inserted into the CID hole 143a to increase a coupling force and a sealing force between the positive electrode tab and the CID hole.

When the coupling of the positive electrode tab and the cap assembly is finished, the cap assembly 140 is coupled to an opening portion of the can 130. Thus, a preliminary battery 100A is completed.

Figure 11:
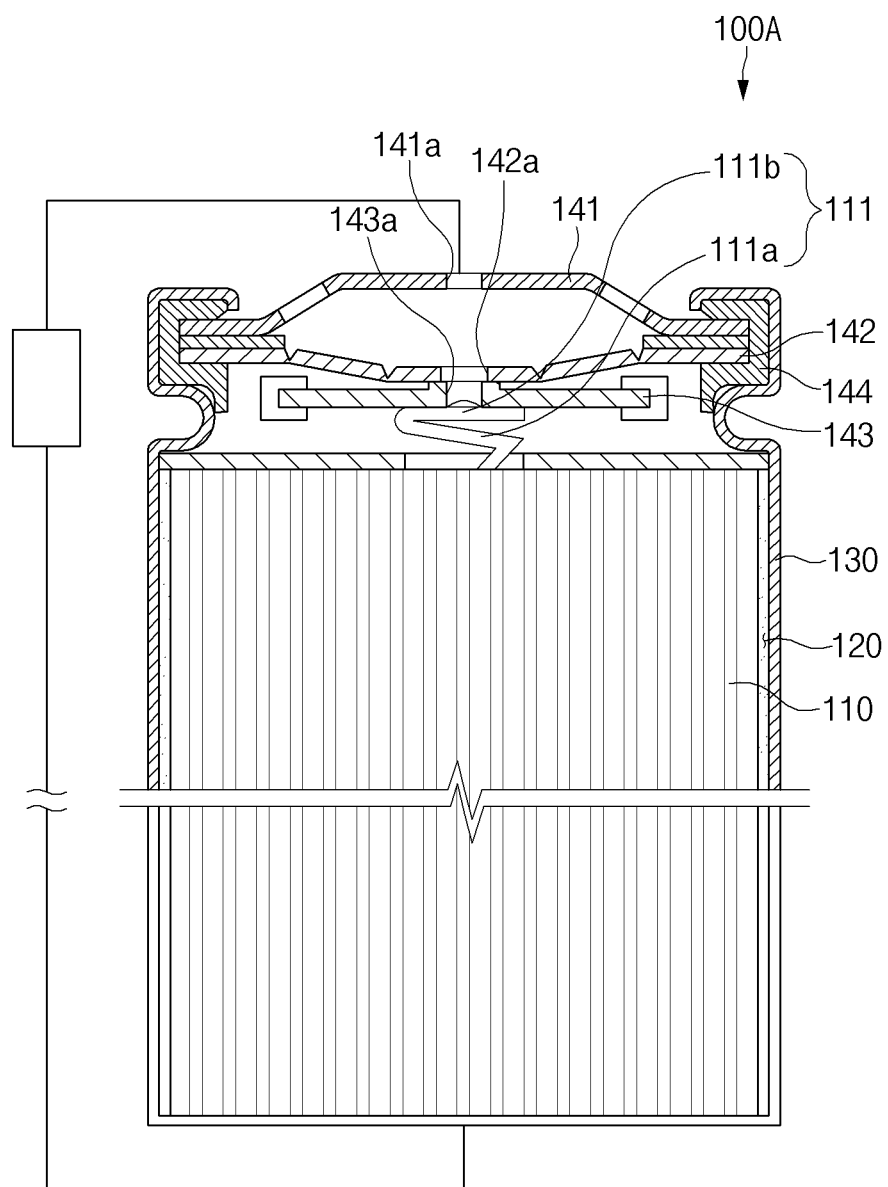
FIG. 11 is a cross-sectional view illustrating an activation step in the method for manufacturing the secondary battery according to the first embodiment of the present invention.

Referring to FIG. 11, in the activation step (S40), the preliminary battery 100A is activated by charging and discharging. Here, a gas is generated inside the can due to interaction between the electrode assembly and the electrolyte, and pressure increases as the gas is accumulated inside the can 130.

Figure 12:
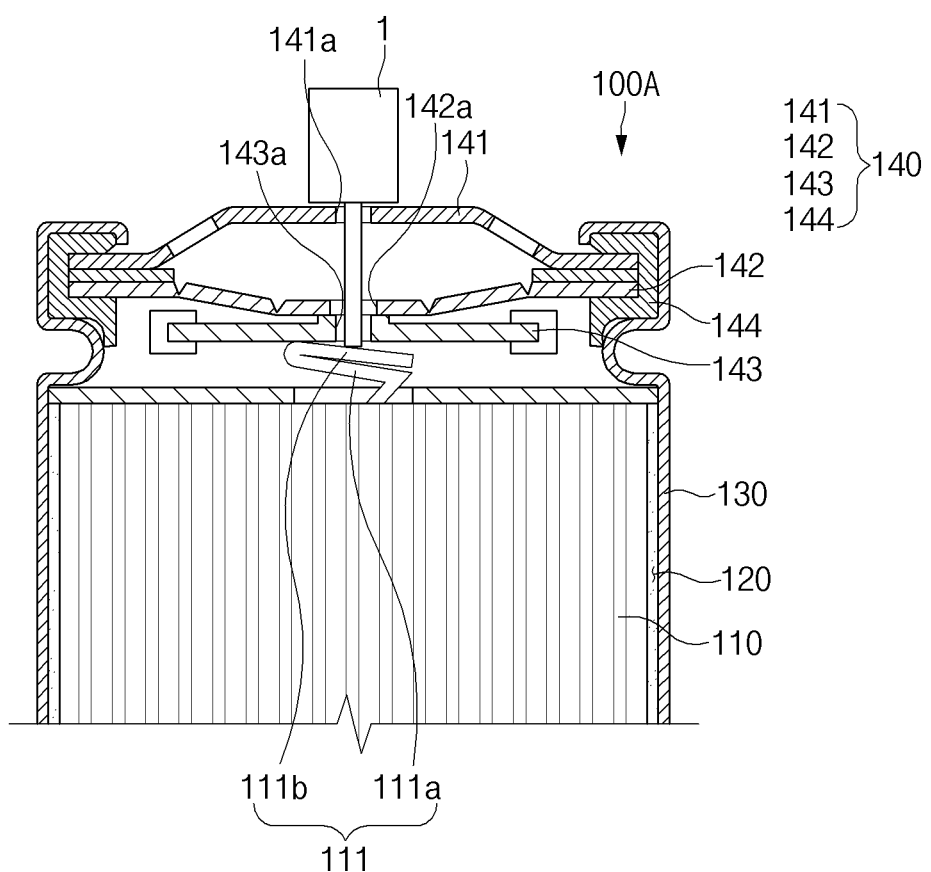
FIG. 12 is a cross-sectional view illustrating a gas discharging step in the method for manufacturing the secondary battery according to the first embodiment of the present invention.

Referring to FIG. 12, in the gas discharging step (S50), the gas generated inside the can 130 is discharged to the outside through the cap assembly 140 of the preliminary battery 100A. That is, a tool 1 is inserted through the top hole 141a, the vent hole 142a, and the CID hole 143a of the cap assembly 140, and thus the positive electrode tab 111 in close contact with the CID filter 143 is pressed downward. Thus, as the CID hole 143a is opened, the gas generated inside the can 130 is discharged to the outside through the CID hole 143a, the vent hole 142a, and the top hole 141a.

Subsequently, when the tool 1 pressing the positive electrode tab 111 is removed, the CID hole 143a may be closed again as the positive electrode tab 111 returns to the original position.

Figure 13:
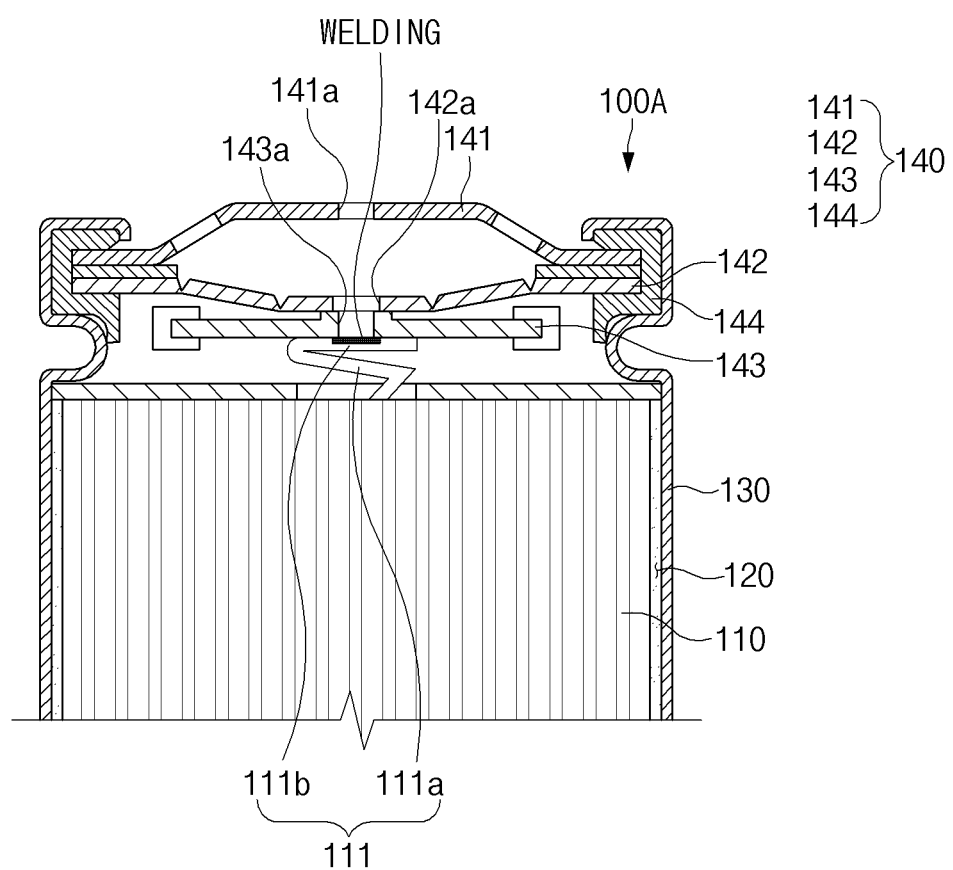
FIG. 13 is a cross-sectional view illustrating a welding step in the method for manufacturing the secondary battery according to the first embodiment of the present invention.

Referring to FIG. 13, in the welding step (S60), the CID hole is closed so that the electrolyte inside the can is not discharged to the outside through the CID hole, the vent hole, and the top hole of the cap assembly. That is, in the welding step (S60), a welding device is inserted through the top hole 141a, the vent hole 142a, and the CID hole 143a of the cap assembly 140, and thus a lower end of the inner circumferential surface of the CID hole 143a is welded to the positive electrode tab 111. In particular, the welding is performed along the inner circumferential surface of the CID hole 143a in close contact with the positive electrode tab 111, and thus a seal is formed between the CID filter 143 and the positive electrode tab 111.

Figure 14:
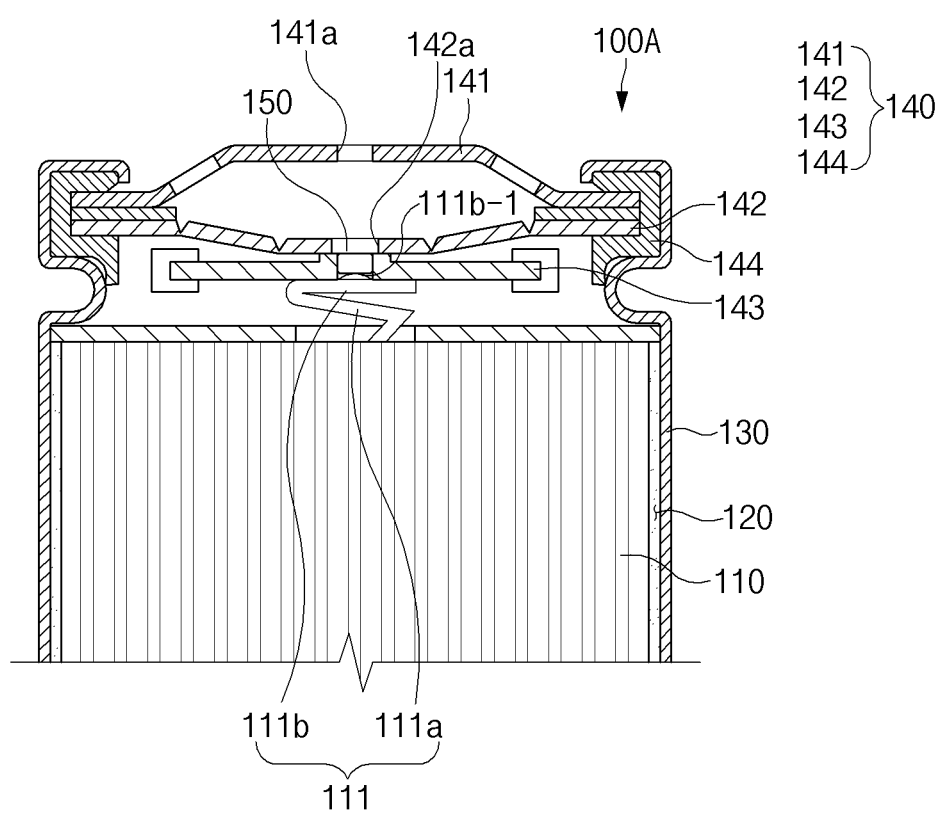
FIG. 14 is a cross-sectional view illustrating a sealing ball inserting step in the method for manufacturing the secondary battery according to the first embodiment of the present invention.

Referring to FIG. 14, in the sealing ball inserting step (S70), a sealing ball 150 is forcibly inserted into the CID hole 143a through the top hole 141a and the vent hole 142a. Thus, the CID hole may be effectively sealed.

Figure 15:
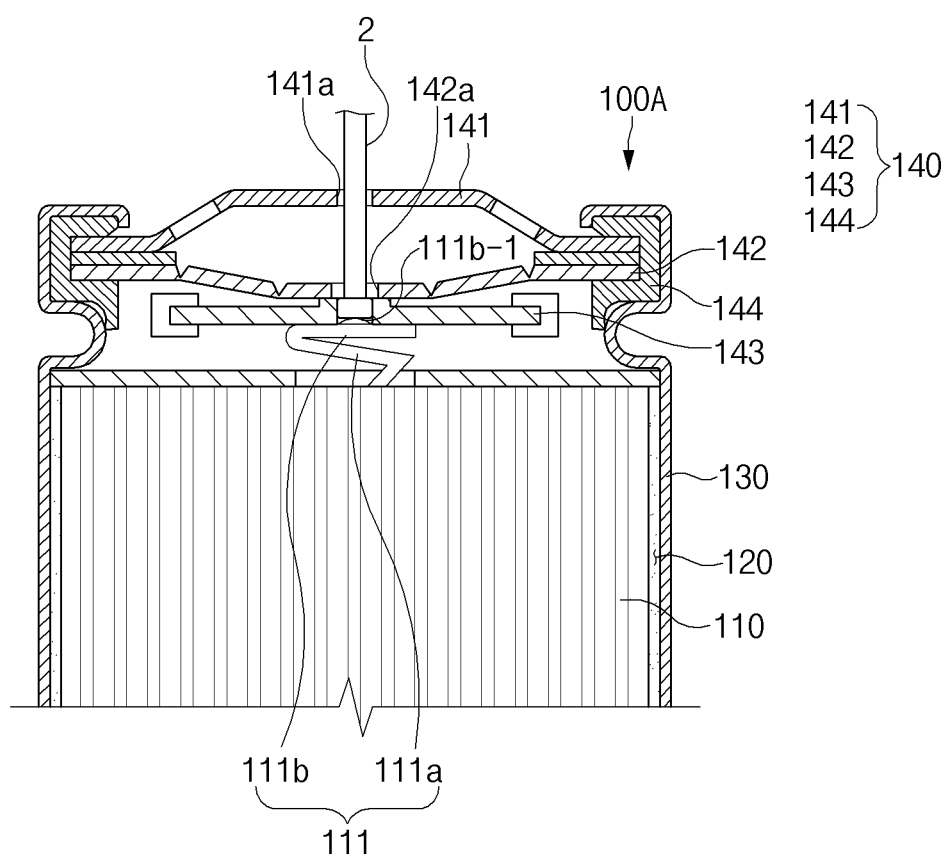
FIG. 15 is a cross-sectional view illustrating a bonding step in the method for manufacturing the secondary battery according to the first embodiment of the present invention.

Referring to FIG. 15, in the bonding step (S80), a melting device 2 is inserted through the top hole 141a and the vent hole 142a, and then the sealing ball 150 is partially melted to seal and bond the sealing ball 150 and the CID hole 143a which are in close contact with each other. Thus, the CID hole may be completely sealed.

Figure 16:
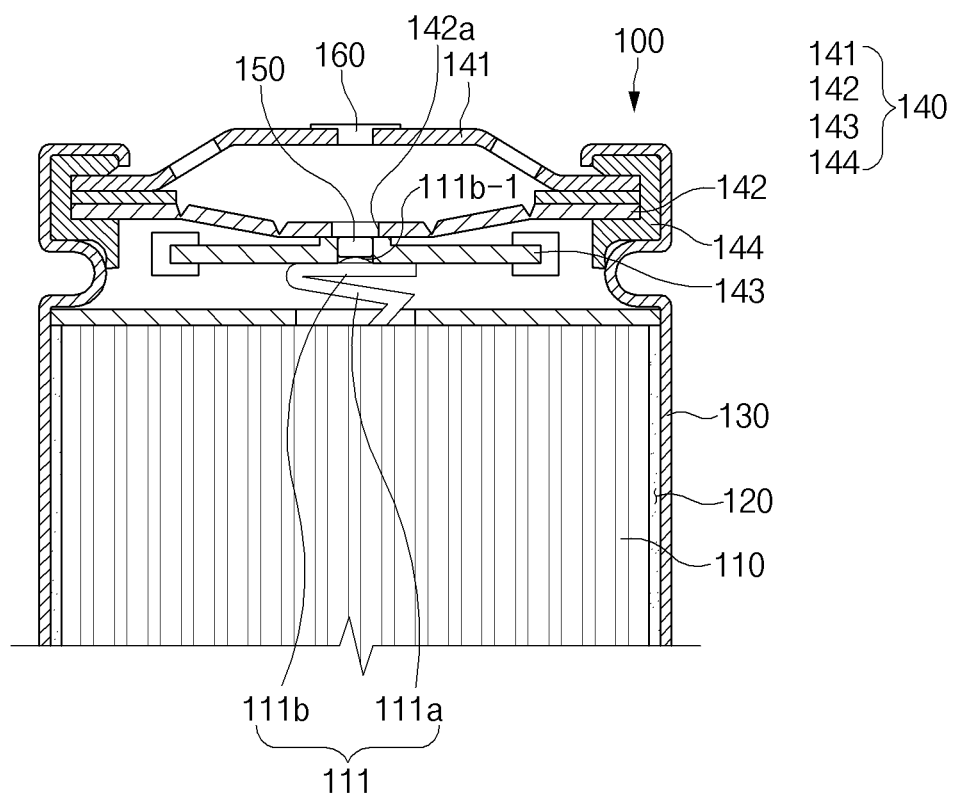
FIG. 16 is a cross-sectional view illustrating a closing step in the method for manufacturing the secondary battery according to the first embodiment of the present invention.

Referring to FIG. 16, in the closing step (S90), a closing cover 160 is coupled to the top hole 141a to close the top hole 141a. Here, the closing cover 160 is made of the same material as the top cap 141. When the closing step is finished, a secondary battery 100 is completed.

Therefore, through the method for manufacturing the secondary battery according to the first embodiment of the present invention, the secondary battery in which the gas is discharged out may be manufactured.

Hereinafter, in describing another embodiment of the present invention, components having the same functions as those in the foregoing embodiment are given the same reference numerals, and their duplicated description will be omitted.

Battery Pack According to a Second Embodiment of the Present Invention

Figure 17:
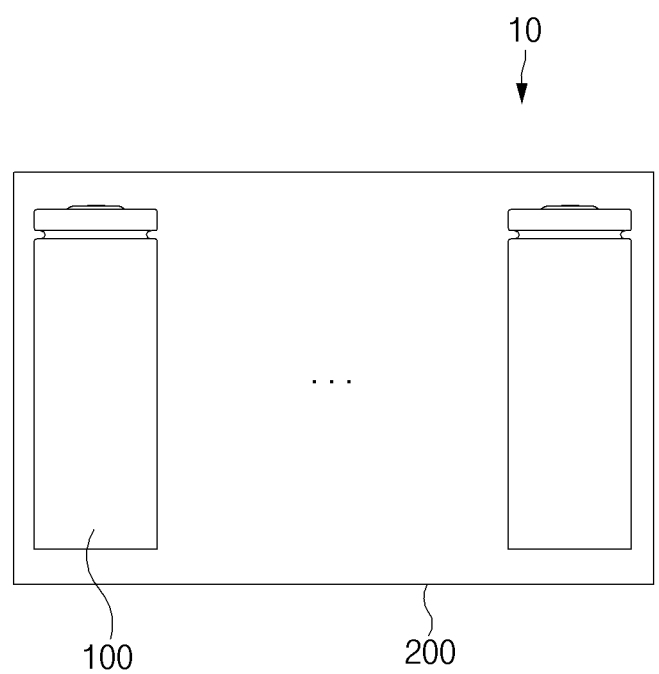
FIG. 17 is a view illustrating a battery pack according to a second embodiment of the present invention.

A battery pack 10 according to the second embodiment of the present invention comprises a secondary battery 100 and a battery case 200 accommodating one or more secondary batteries 100 as illustrated in FIG. 17.

Here, the secondary battery 100 has the same components and functions as the secondary battery according to the first embodiment described above, and thus a duplicated description will be omitted.

Therefore, the battery pack 10 according to the second embodiment of the present invention comprises the secondary battery in which the gas inside the can is discharged out, and thus the battery performance may be significantly improved.

Method for Manufacturing the Battery Pack According to the Second Embodiment of the Present Invention A method for manufacturing the battery pack according to the second embodiment of the present invention comprises a step of manufacturing a secondary battery 100 and a step of accommodating the secondary battery 100 in a battery case 200.

Here, the step of manufacturing the secondary battery 100 has the same method as the method of manufacturing the secondary battery described above, and thus a duplicated description will be omitted.

Therefore, the method for manufacturing the battery pack according to the second embodiment of the present invention may manufacture the battery pack 10 that comprises the secondary battery 100 in which the gas in the activation step is discharged out.

Cap Assembly According to a Third Embodiment of the Present Invention

Figure 18:
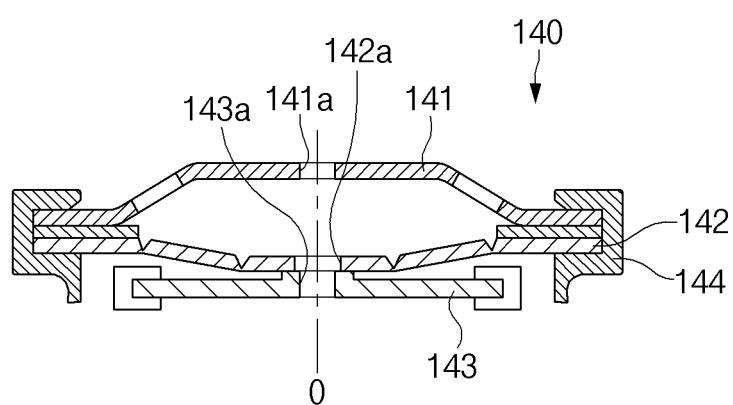
FIG. 18 is a cross-sectional view illustrating a cap assembly according to a third embodiment of the present invention.

A cap assembly 140 according the third embodiment of the present invention comprises a top cap 141 which has a top hole 141a vertically passing therethrough, a safety vent 142 which is provided below the top cap 141 and has a vent hole 142a vertically passing therethrough, and a CID filter 143 which is provided below the safety vent 142 and has a CID hole 143a vertically passing therethrough, as illustrated in FIG. 18.

The top hole 141a, the vent hole 142a, and the CID hole 143a may be formed on the same vertical line O.

Here, the cap assembly according to the third embodiment of the present invention has the same components and functions as the cap assembly provided in the secondary battery described above, and thus a duplicated description will be omitted.

Therefore, the cap assembly according to the third embodiment of the present invention may discharge to the outside the gas generated inside the can through the top hole 141a, the vent hole 142a, and the CID hole.

The scope of the present invention is defined by the appended claims rather than the foregoing description, and various embodiments derived from the meaning and scope of the claims and their equivalent concepts are also possible.

DESCRIPTION OF THE SYMBOLS

10: Battery pack
100: Secondary battery
110: Electrode assembly
120: Electrolyte
130: Can
140: Cap assembly
141: Top cap
142: Safety vent
143: CID filter
150: Sealing ball
160: Closing cover
200: Battery case

The invention claimed is:

1. A method for manufacturing a secondary battery, the method comprising: a cap assembly manufacturing step of disposing a top cap having a top hole on a top side, disposing a safety vent having a vent hole below the top cap, and then disposing a current interrupt device (CID) filter having a CID hole below the safety vent, thereby manufacturing a cap assembly;
   an electrode assembly and electrolyte accommodating step of accommodating an electrode assembly into a can and then injecting an electrolyte to impregnate the electrode assembly therewith;
   a preliminary battery manufacturing step which comprises a disposing process of disposing the cap assembly above the can and a coupling process of coupling a positive electrode tab provided in the electrode assembly to a bottom surface of the CID filter of the cap assembly, thereby manufacturing a preliminary battery, wherein a distal end of the positive electrode tab closes the CID hole;
   an activation step of charging and discharging the preliminary battery; and
   a gas discharging step of pressing downward the positive electrode tab in contact with the CID filter through the CID hole, the vent hole, and the top hole of the cap assembly with a force, thereby opening the CID hole and discharging a gas generated inside the can to the outside through the CID hole, the vent hole, and the top hole.

2. The method of claim 1, wherein the top hole, the vent hole, and the CID hole are located on the same vertical line in the cap assembly manufacturing step.

3. The method of claim 1, wherein the vent hole has a diameter greater than diameters of the top hole and the CID hole in the cap assembly manufacturing step.

4. The method of claim 1, wherein the cap assembly manufacturing step further comprises a process of coupling the safety vent to a top surface of the CID filter through the top hole so that the vent hole and the CID hole are in communication with each other.

5. The method of claim 4, wherein a lower surface of the safety vent around the vent hole and an upper surface of the CID filter around CID hole, which correspond to each other, are sealed and coupled.

6. The method of claim 1, wherein the positive electrode tab comprises a lower tab portion connected to the electrode assembly and an upper tab portion connected to the lower tab portion, the upper tab portion having a first end connected to the lower tab portion and a second end spaced from the first end,
wherein, in the coupling process, the upper tab portion is brought into surface contact with the bottom surface of the CID filter, the second end of the upper tab portion is moved to close the CID hole, and then the first end of the upper tab portion is coupled to the bottom surface of the CID filter.

7. The method of claim 6, wherein a sealing protrusion is provided on the upper tab portion, and
wherein, when the second end of the upper tab portion is moved to close the CID hole in the coupling process, the sealing protrusion is inserted into the CID hole to increase a sealing force.

8. The method of claim 1, wherein, when the force of pressing the positive electrode tab is removed in the gas discharging step, the positive electrode tab closes the CID hole again while returning to an original position.

9. The method of claim 1, further comprising a welding step of welding a lower end of an inner circumferential surface of the CID hole to the positive electrode tab through the vent hole and the top hole of the cap assembly after the gas discharging step.

10. The method of claim 9, wherein the welding is performed in the welding step along the inner circumferential surface of the CID hole in contact with the positive electrode tab, thereby forming a seal between the CID filter and the positive electrode tab.

11. The method of claim 9, further comprising a sealing ball inserting step of inserting a sealing ball into the CID hole through the top hole and the vent hole after the welding step.

12. The method of claim 11, further comprising a bonding step of partially melting the sealing ball through the top hole and the vent hole after the sealing ball inserting step, thereby sealing and bonding the sealing ball and the CID hole.

13. The method of claim 12, further comprising a closing step step of coupling a closing cover to the top hole after the bonding step, thereby closing the top hole.

14. The method of claim 13, wherein the closing cover is made of a same material as the top cap.

15. A method for manufacturing a battery pack, the method comprising:
a step of manufacturing a secondary battery by performing the method of claim 1; and
a step of accommodating the secondary battery in a battery case.

* * * * *